United States Patent Office 2,872,316

Patented Feb. 3, 1959

2,872,316

METHOD OF PRODUCING PATTERNS

Thaddeus Victor Rychlewski and Robert Frederick Wilson, Seneca Falls, N. Y., assignors to Sylvania Electric Products Inc., a corporation of Massachusetts No Drawing. Application June 20, 1955
Serial No. 516,766

3 Claims. (Cl. 96—35)

This invention relates to a method of forming discrete patterns on a viewing panel and more particularly to a method of forming a phosphor pattern on a color picture tube image screen.

Present methods used in forming phosphor patterns on image screens incorporated in color picture tubes of a type such as those employing an aperture mask generally include photo printing techniques. In these methods the patterns are formed by exposing predetermined areas of a layer of photosensitive material and phosphor to a light source and subsequently developing out the exposed pattern. This process is repeated for each of the three color phosphor pattern forming operations.

In the above described methods, when the exposed areas of the photo-sensitive material and phosphor layer are not completely cleaned by the developing step after each phosphor pattern forming operation, a color contamination called cross contamination occurs. This cross contamination of two or possibly all three of the color phosphors causes an impure or at least desaturated reproduction of the desired color when the electron beam of the tube excites the particular contaminated areas. Thus, the present methods of forming phosphor panels frequently result in rejects and costly reworking procedures.

It is therefore an object of the invention to provide an improved method of forming the phosphor image screen for a color television picture tube.

A further object is to provide a method of forming a phosphor pattern in which cross color contamination is reduced to a minimum.

The foregoing objects, in addition to other objects which will be apparent upon reading the following description, are achieved in one aspect of the invention by the provision of a method which utilizes an operation wherein the panel is subjected to an abrasive cleaning step after each color phosphor pattern has been formed.

For a better understanding of the invention, together with other and further objects, advantages and capabilities thereof, reference is made to the following description.

In detail, a method of making an image screen for a color television picture tube in accordance with one embodiment of the invention utilizes the application of a coating of radiant energy sensitive material and phosphor to the viewing panel of the tube. This coating application may be accomplished by first depositing radiant energy sensitive material on the panel followed by the phosphor or it may be by the application of a suspension of phosphor in the radiant energy sensitive material. The coating can be deposited by any conventional method such as by whirling, spraying, or settling. It is common to use a light sensitive substance such as polyvinyl alcohol sensitized with ammonium dichromate as the radiant energy sensitive material, and assuming that the red phosphor will be the first of the three phosphors to be applied, a phosphor composition such as zinc phosphate may be used. After the polyvinyl alcohol and zinc phosphate have been applied to the panel, a drying operation conditions the coating for the exposure step. The coated panel is then subjected to the rays of a point source of light passing through a negative or aperture mask, thereby sensitizing or hardening those areas of the coated panel which have been exposed to the light rays. The point source of light and the aperture mask are arranged with respect to one another so that the light rays will strike an area on the panel corresponding to the red cathode emitter excitation area of a three gun type color picture tube. The sensitized pattern is then developed by washing the panel with any convenient rinsing fluid such as deionized water so that the non-sensitized or unhardened areas of the coating are removed. Since the developing step may fail to completely clean the non-sensitized areas, and in order to minimize possible cross contamination which might result, this developing operation is followed by a cleaning step wherein substantially all of the unexposed polyvinyl alcohol and zinc phosphate coating is removed. It has been found that the application of an abrasive material over the entire panel does minimize possible cross contamination. This abrasive cleaning step may be accomplished in any conventional manner such as by agitating the panel surface with a powdered abrasive, or by sloshing an abrasive slurry over the panel surface. Any relatively coarse abrasive material such as emery powder or Alundum may be used. For instance, it has been found that from 5 to 200 grams of these abrasive materials in about a liter of water will satisfactorily clean the unexposed areas. Alundum is a commercially available product which is described in Reference Book of Inorganic Chemistry, 1940, by Wendell L. Latimer and Joel H. Hildebrand, page 92, as "artificial corundum made by fusing the precipitated hydroxide in an electric furnace" and in Webster's New International Dictionary, Second edition, 1956, as "a material resembling corundum and made by fusing alumina in an electric furnace." The abrasive slurry is subsequently removed by draining and washing the panel with deionized water to complete the process of forming the red phosphor pattern on the picture tube panel.

The aforementioned process steps are repeated a second time to accomplish the deposition of a second phosphor pattern which may employ the green phosphor, zinc orthosilicate. This pattern will cover another portion of the panel not covered by the red phosphor pattern, and will be, for example, positioned in accordance with the green cathode emitter excitation area of a three gun color tube. After the green phosphor pattern has been completely deposited and the areas intermediate the green and red patterns have been cleaned by the abrasive slurry, the above process steps are repeated a third time in order to produce a zinc sulfide blue pattern corresponding to the blue cathode emitter excitation area for completion of the viewing panel of a color television picture tube.

The method described above is not limited to the manufacture of a shadow mask type of color picture tube, since it is applicable to the formation of any type of phosphor viewing screens formed by sequential depositions of the three color phosphors over an entire panel area.

Tri-color picture tube viewing panels made in accordance with the invention have improved color reproduction characteristics, since the phosphor pattern has substantially all the cross color contamination removed therefrom. In addition, the number of rejects for undesirable cross contamination is greatly reduced.

While there has been described what at present is considered the preferred embodiment of the invention, it will be obvious to those skilled in the art that various changes and modifications may be made therein without departing from the scope of the invention as defined by the appended claims.

What is claimed:

1. A method of forming a phosphor pattern on the viewing panel of a cathode ray tube comprising the steps of coating said viewing panel with a layer of a light hardenable substance and a phosphor, exposing portions of said layer of light rays through a pattern negative, developing said pattern by washing the panel with a solvent for the unexposed portions of said light hardenable substance, applying an abrasive slurry to said panel, agitating said slurry to substantially remove any of the unexposed portions of said layer remaining after development, and removing said slurry from the panel.

2. A method of forming a phosphor pattern on the viewing panel of a cathode ray tube comprising the steps of coating said viewing panel with a layer of a light hardenable substance and a phosphor, exposing portions of said layer of light rays through a pattern negative, developing said pattern by washing the panel with a solvent for the unexposed portions of said light hardenable substance, applying an artificial corundum slurry to said panel, agitating said slurry to substantially remove any of the unexposed portions of said layer remaining after development, and removing said slurry from the panel.

3. A method of forming a phosphor pattern on the viewing panel of a cathode ray tube comprising the steps of coating said viewing panel with a layer of a light hardenable photosensitive substance and a phosphor, exposing portions of said layer to light rays through a pattern negative, washing said layer with a developing fluid, and applying an emery powder slurry to said panel to substantially remove any unexposed portions of said layer remaining after development.

References Cited in the file of this patent

UNITED STATES PATENTS

| | | |
|---|---|---|
| 1,965,710 | Murray | July 10, 1934 |
| 2,747,997 | Smith et al. | May 29, 1956 |

FOREIGN PATENTS

| | | |
|---|---|---|
| 1,072,322 | France | Mar. 17, 1954 |
| 713,908 | Great Britain | Aug. 18, 1954 |